July 7, 1953  H. L. GLOVER  2,644,197
METHOD FOR MANUFACTURING CORK GASKETS
Filed Jan. 13, 1951  2 Sheets-Sheet 2
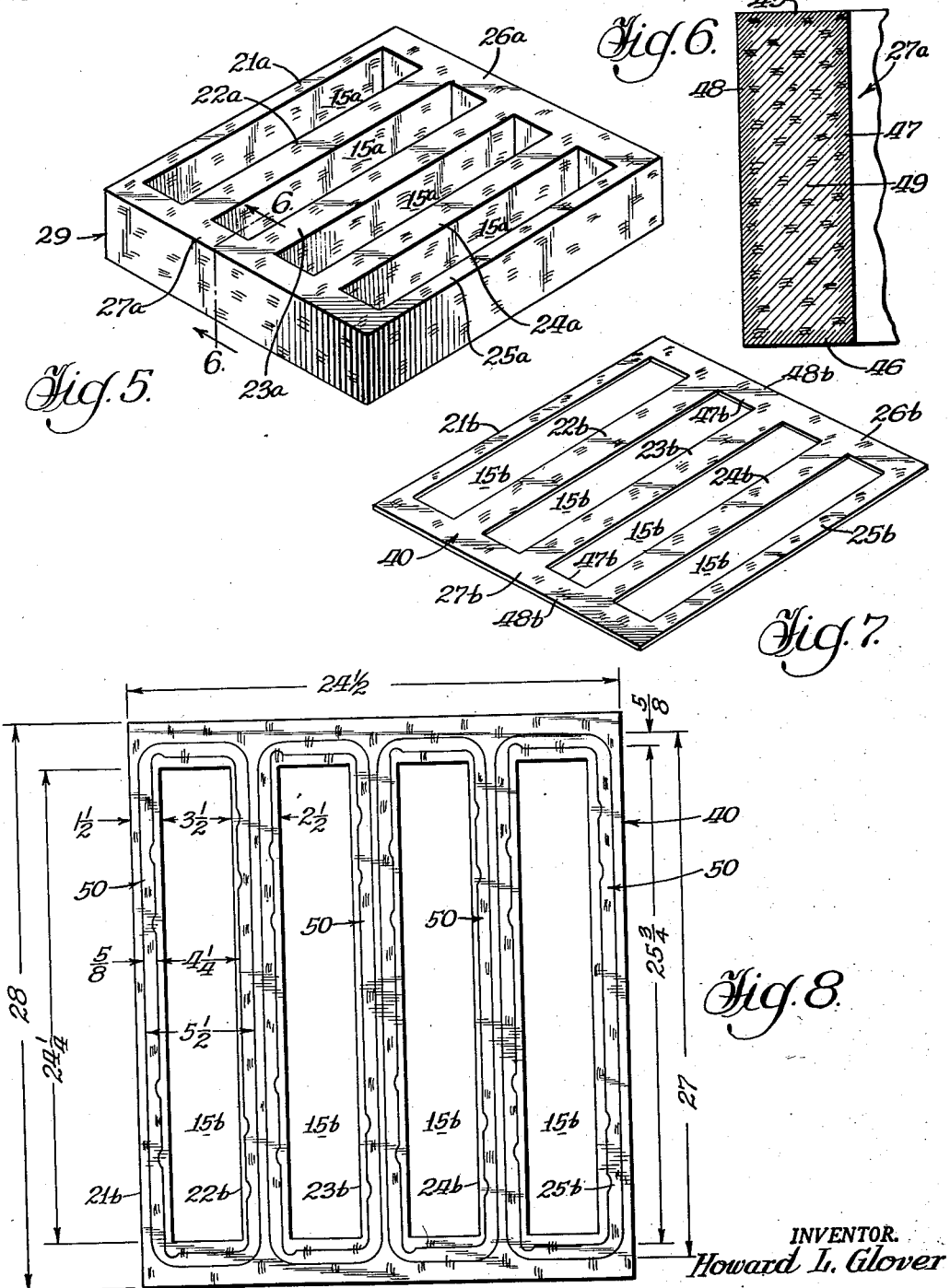
INVENTOR.
Howard L. Glover Patented July 7, 1953

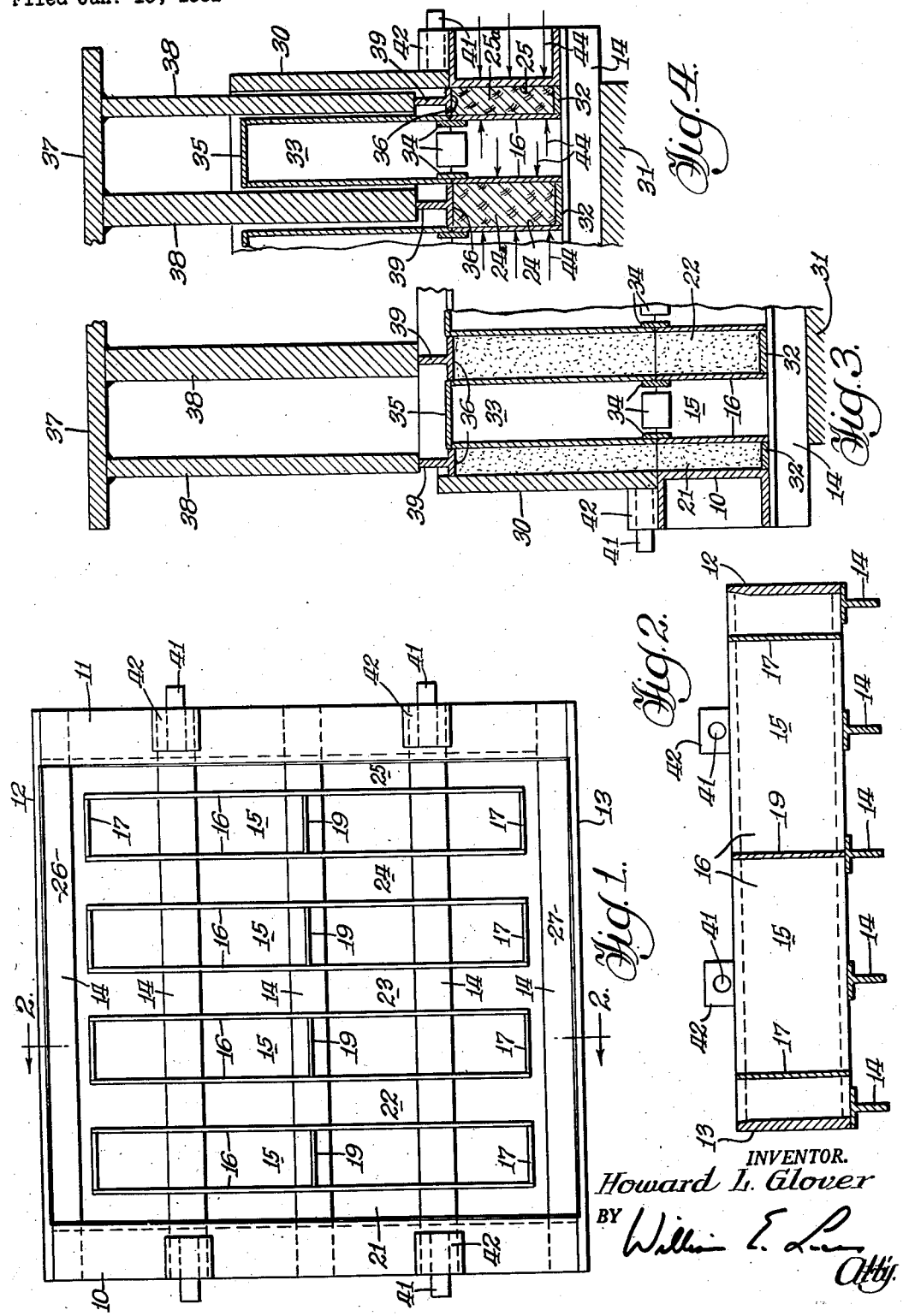

2,644,197

UNITED STATES PATENT OFFICE 2,644,197

METHOD FOR MANUFACTURING CORK GASKETS

Howard L. Glover, Chicago, Ill.

Application January 13, 1951, Serial No. 205,890

3 Claims. (Cl. 18—47.5)

This invention relates to cork gaskets and deals particularly with the methods employed in manufacturing such gaskets.

Cork gaskets are very old and have been widely utilized for effecting a proper seal between metal surfaces. They have been employed in almost every conceivable type of machinery, but have been particularly widely used in the automobile industry, where they are employed for sealing crank cases, valve covers and many and various other parts. Notwithstanding this, the methods heretofore employed in the manufacture of these gaskets have been extremely wasteful, both as to time required and as to material consumed, with the result that the manufacturing processes employed in making the gaskets have been unnecessarily expensive.

It is therefore the primary object of the present invention to provide a new and different method for manufacturing cork gaskets. In proposing such a new method, it is the primary aim of the invention to provide a method for manufacturing gaskets which are of equal or superior quality to those manufactured heretofore, yet to reduce the time required by the manufacturing processes substantially, and to accomplish these objects by the use of only a fraction of the raw material heretofore required.

These objects are accomplished in the present by practice of a new method which has been found by actual test to require only about one-half of the raw material required by conventional processes, and to nevertheless produce gaskets in approximately half of the time heretofore required, with a corresponding reduction in labor costs. Obviously, this gives rise to important increases in production in a manufacturing plant of any given size, or makes it possible to produce a given daily output of gaskets with far less equipment and manpower than heretofore required.

The teachings of the present invention are applicable to almost all of the larger types of cork gaskets, particularly those intended to seal the marginal edges of a crank case, oil housing, valve rocker arm cover, or other similar housing. The invention is applicable, however, to any of the larger gaskets having an open center portion therein.

The principles of this invention will be discussed in connection with equipment specifically designed for producing a type of gasket which is a typical example of one of the uses to which cork gaskets are ordinarily put; namely, a gasket for a valve rocker arm cover of an automobile engine. Before describing the apparatus and method employed herein in detail, however, it may be advisable to point out that the present invention contemplates manufacture of gaskets formed of ground cork which is first mixed with a binder such as glue or thermosetting plastic, which is compressed and baked until the cork mass has solidified into a fairly rigid yet resilient body, consisting primarily of cork so that it has the compressibility requisite for use as gasket material, yet having a sufficient tensile strength so that it may be handled and put in place without undue likelihood of damage.

The present applicant has learned that in any operation involving the baking of such a body of compressed cork, the extraordinary thermal insulating properties of the cork impose a serious limitation on the design of the equipment employed, since while it is essential that the cork body be adequately baked throughout, it is nevertheless desirable that its design be such that this baking may be accomplished within a reasonable length of time. Otherwise, to manufacture any appreciable number of gaskets, an unnecessarily large amount of molding equipment is required.

The applicant has learned that in almost all conventional types of gaskets required for modern machines, particularly automobiles, the gaskets themselves are of what may be termed "marginal shapes" having an open center of an area greatly exceeding the actual surface area of the gasket, and that the actual width required at any portion of the gasket seldom exceeds one inch and is often considerably less. It is therefore a proposal of the present invention to provide molding equipment so designed and constructed as to mold a cork body in a form which we may conveniently refer to as a "frame," having a number of openings through the body separated by integral cork sections, with the individual sections of considerably greater thickness than their width. By this expedient it is entirely feasible to mold relatively thick bodies of solid cork material, since the cork may be baked by introducing hot air into ducts passing through the openings therein, as well as by applying exterior heat. Thus the body of cork is not heated primarily from the top and bottom surfaces thereof, but is baked by heat transmitted laterally inward from the outside of the mold and at the same time transmitted laterally outwardly from the core through air ducts passing therethrough. This lateral heating of the cork during the baking process is of extreme importance in that it permits the construction of molding equipment wherein the thickness of the cork body is limited only by the capacity of the presses employed in filling the mold, so that a relatively large number of individual gaskets may be obtained from each block of the molded cork.

The air ducts passing through the block of cork are also important during the cooling of the product, since here again they provide more efficient heat transfer than heretofore practicable and permit the cork body to cool with unusual rapidity until it is reduced to a temperature where it has "set" (that is, individual cork particles have become bonded into an integral self-sustaining mass, free of any tendency to warp, swell or otherwise distort). This also means that the cork has become cool enough for handling and further processing in a much shorter time than required by conventional processes.

Notwithstanding the above, the present teaching provides a method wherein the gaskets may be formed entirely of what may be termed the "core" portion of the compressed cork body. This is essential since it is well known in the art that the surfaces of a molded cork body, after baking, are unsatisfactory for gasket use in that they are somewhat hard and brittle, and lack flexibility, resiliency and tensile strength requisite for a high quality gasket. This is readily apparent even from the most casual inspection of the gasket material, from which it will be seen that the outer surfaces of a baked cork body are considerably darkened in color and somewhat brittle, often giving the appearance of having been scorched or burned, while the interior or core portion of the cork possesses all of the strength and resiliency of the cork itself and is of proper color and texture.

The present form of the invention is illustrated herein with apparatus employed for making automobile valve rocker arm covers, and equipment specifically designed for this purpose is illustrated in the drawings of this specification wherein:

Figure 1 is a plan view of a typical mold employed to practice the present method of manufacture;

Figure 2 is a transverse sectional view taken substantially on the plane of the line 2—2 of Figure 1;

Figure 3 is a fragmental cross sectional view of the mold and its coacting parts as they are assembled in a press prior to compression of a mass of ground cork and binder therein;

Figure 4 is a sectional view similar to Figure 3, showing the parts of the mold after the cork body therein has been properly compressed;

Figure 5 is a perspective view of a baked cork frame as contemplated by the present invention;

Figure 6 is a fragmental detail cross sectional view taken substantially on the plane of the line 6—6 of Figure 5; and illustrating the relationship between the relatively brittle crust of the cork and the resilient core thereof;

Figure 7 is a detail perspective view of an individual sheet of cork sliced from a frame such as illustrated in Figure 5; and Figure 8 is a plan view of a sheet such as illustrated in Figure 7 after the gaskets have been die cut therefrom.

The mold employed herein consists of a main metal frame comprising channel irons 10 and 11 at the opposite sides joined by flat metal plates 12 and 13 at the ends of the mold. The mold is open at the top and bottom (Figure 2), but is provided with a multiplicity of cross bars 14 which, as illustrated, are T shaped in cross section and extend between the side channels 10 and 11. The mold is provided with four hollow air ducts 15, each having opposite side walls 16 standing upright on the cross bars 14 and welded thereto, with the opposite ends of the side walls joined by end plates 17. As illustrated, the air ducts are provided with central partitions 19 which space the walls of each duct apart from each other and provide a reinforcement for these walls when the powdered cork material is compressed within the mold. The walls 16 and 17 of these ducts 15 are adjacent but spaced from the exterior wall members 10, 11, 12 and 13 of the mold and are similarly spaced from each other, so that the mold is divided into a plurality of sections 21, 22, 23, 24 and 25, which run the full length of the mold in one direction, and are united at each end by the transverse sections 26 and 27. Thus, when the pulverulent cork from which the cork frame is to be made is inserted in the mold and compressed, the sections 21 to 27 form into an integral solid frame of cork, while the air ducts 15 form hollow spaces or openings therein.

The manner in which the molds are utilized in compressing the cork body is best illustrated in connection with Figures 3 and 4, wherein it will be seen that the frame of the mold, that is, the channels 10 and 11, end plates 12 and 13, and the cross bars 14 are positioned on the bed 31 of a hydraulic press. The open bottom of the mold is closed by a perforated plate 32, which is of generally rectangular shape, having its outer dimensions fitting loosely between the channels 10 and 11 at the sides and between the plates 12 and 13 at the ends. This plate 32 has four apertures formed therein to correspond with the size and shape of the air ducts. Thus, this plate may be inserted in the mold to rest on the cross bars 14 as illustrated. The open top of the mold is preferably provided with an extension to increase the capacity thereof. Conveniently, this extension may be in the form of a rectangular wall 30 which is preferably of a size corresponding to the length and width of the mold, and of a height sufficient to extend the effective height of the mold to about three times the height of the side channels and end plates thereof. Four removable blocks 33 are also positioned in the four air ducts 15, so that the height of the plates 16 and 17 is increased accordingly. Each of the blocks 33 comprises side and end walls corresponding to the walls 16 and 17, and has inwardly offset mounting flanges 34 so that they maintain themselves in position when telescoped into the upper ends of the air ducts. The tops of the blocks 33 are closed by flat plates 35 so that when the top of the mold is open it may be conveniently filled with powdered cork material, which will be prevented from flowing through the air ducts 15 by the blocks, but will be allowed to accumulate in the sections 21—27 of the mold and the portions of the mold extension disposed thereabove.

A top plate 36 of size and shape corresponding to the bottom plate 32 is then placed in position on the mold and the bed 31 of the press is raised until the top plate is engaged by a ram 37 which forces the top plate to exert pressure on the cork within the mold. The ram 37 has downwardly extending flanges 38 corresponding to the shape of the top plate 36. These flanges bear directly on reinforcing flanges 39 welded to the top plate 36, so that as the bed 31 of the press moves upwardly, the body of cork will be compressed from the position shown in Figure 3 to that of Figure 4. At this point, the entire mass of the ground cork and its binder has been compressed into a cork frame corresponding in size and shape to the sections 21—27 of the mold, and represented in Figure 4 by the solid cork sections 24a and 25a. When the cork has thus been compressed it is entirely within the frame of the mold, so that the auxiliary wall or extension 30 of the mold may be removed and the top plate of the mold locked in place. To this end, the extension wall 30 is first manually lifted, and the top plate 36 is locked in position by driving the four locking pins 41 inwardly through the mounting brackets 42, until their inner ends overlie the edges of the top plate 36. The press may then be opened and the extension blocks 33 removed. The molds, with the cork held in compressed condition therein, will then be in condition for baking.

It is to be noted that when the blocks 33 are removed from the mold air ducts 15 are left entirely open from top to bottom, so that hot air may be introduced into these ducts during the baking process, so that heat will be applied to the cork frame from the inside thereof as well as from the outside. That is, each of the individual sections of the mold (represented in Figure 4 by the sections 24 and 25) will be heated primarily by heat entering the mold laterally as illustrated by the arrows 44 of the figure. This brings about quick penetration of the heat into the central portion of the cork even in a relatively thick cork frame, since the depth to which the heat must penetrate is never greater than half the distance between these vertical surfaces, which may be quite close together irrespective of the height of the mold. Thus, the time required for baking the frames is not dependent on the thickness of the cork frame to be produced. It follows that frames of any desired thickness may be employed without unduly increasing the time required for adequate baking thereof.

When the baking of the cork frame is completed, the molds are placed in a cooling chamber and blowers are provided to circulate relatively cool air over the exterior surfaces of the molds and through the air ducts thereof. Here, again, the presence of the air ducts greatly increases the efficiency of heat transfer during the cooling operation in the same manner as heretofore described, and therefore permits the molds to be rapidly cooled to a temperature at which the ground cork and its binder becomes "set"; that is, when they become a relatively rigid, stable mass which is not thereafter unduly subject to swelling, buckling or other distortion. At this time the mold is cool enough for handling and the frame may be removed therefrom for further processing.

The "frame" or body 29 of cork (Figure 5) is taken from the mold by removing the pins 41 and the top plate 36 and forcing the bottom plate 32 upwardly to force the frame out of the mold. The completed frame 29 is an integral unitary body of cork as illustrated, having a plurality of relatively large elongated central openings 15a corresponding to the air ducts 15 and consisting of sections 21a, 22a, 23a, 24a and 25a integral with and extending between end sections 26a and 27a. These sections, of course, correspond with the sections 21 to 27 of the mold.

It has heretofore been pointed out that in the baking process the exterior surfaces of the cork body become somewhat brittle and lack the resiliency required for the production of highest quality gaskets. This condition is illustrated in Figure 6 wherein it will be seen that the section 27a of the frame has an outer crust comprising upper and lower layers 45 and 46 with inside and outside layers 47 and 48, all of which surround the inner resilient core portion 49 which is best suited to the production of high quality gaskets. By practicing the present invention, however, it is possible to greatly reduce the amount of raw material required for the manufacture of a given number of gaskets and at the same time to produce gaskets of the highest possible quality employing only the choice portions of the cork having the desired degree of strength, flexibility and rigidity. This is accomplished by first trimming one flat surface of each of the frames (for example, removing the top crust layer 45) and then slicing the remainder of the frame into relatively thin flat slices 40 as illustrated in Figure 7, which slices are thereafter die cut into individual gaskets as illustrated in Figure 8.

It is to be noted that when the upper layer of crust 45, for example, has been trimmed off, repeated slices taken from the flat surface of the frame shown in Figure 5 will appear as thin resilient sheets having sectional strips 21b to 25b extending between and integral with sectional strips 26b and 27b at the ends. These strips will have, however, at their inner and outer edges, narrow portions of crust 47b and 48b which have less resiliency than required for the best type of cork gasket. It is therefore the practice of the present invention to die cut the individual gaskets 50 from the central or core portion of each of the sectional strips as illustrated in Figure 8. Thus, each endless gasket is die cut from around one of the apertures 15b of the sheet 40, but the parts of the frame and gasket are so proportioned that the gasket in each case is somewhat larger than the aperture and is spaced from the inner and outer edges of the sectional strips at all points. Thus, the gaskets 50 utilize only the core portion of the frame which has the greatest strength, resiliency and compressibility, and is the most suitable for its required purpose. At the same time, it is to be noted that the present teachings require only about half of the raw material that would be required by a solid cork body of the same exterior dimensions, since with the dimensions shown, the cubic capacity of the openings through the frames is approximately one-half of the total volume of the mold.

From the above it should be apparent that by practice of the teachings of this invention several important advances in the gasket making art are accomplished. In the first place, it will be readily apparent that by the use of the equipment and processes here disclosed a given number of gaskets may be produced with much less raw material than heretofore required, in fact, with a requirement of only about one-half of the material necessary for production of the same gaskets by utilization of a solid block of cork. Moreover, it will be seen that the provision of the relatively large air ducts through the mold provides means for increasing the heat transfer efficiency in the baking operation so greatly that the stock for a given number of gaskets may be processed in somewhat less than half of the time required by the most efficient processes heretofore known to the applicant. Moreover, the practice of the present invention provides in addition to the above the means whereby the gaskets may be so manufactured as to utilize only the core portion of the cork which has the highest tensile strength, resiliency and compressibility, and is consequently the most satisfactory for production of a gasket of high quality. In addition to the above, it is to be noted that the present invention provides a certain amount of dimensional leeway in the production of gaskets of the same general type, since with a frame of the dimensions shown for example, a manufacturer may produce quantities of the precise form of gasket illustrated, but may convert to another similar gasket having substantially the same dimensions but different detailed configuration merely by the provision of another set of cutting dies without the need of changes or of modifications of the molding equipment. This is of considerable advantage in production of gaskets for automotive manufacturers, for example, wherein changes from one yearly model to the next ordinarily involve only very small detailed changes in shape or only very small changes in dimensions, and wherein the changes in overall dimensions from year to year are seldom enough to exceed the limits provided in a mold producing frames of substantially the proportions shown herein.

The present invention has been disclosed herein in connection with one preferred embodiment in which it finds a high degree of utility and has shown itself to be of considerable commercial advantage. It is to be understood, however, that the precise forms of apparatus shown herein are illustrated by way of example rather than in limitation of the disclosure hereof, and that the invention is of sufficiently broad scope to include within its purview any variations or modifications of the method coming within the terms of the appended claims.

Having thus described my invention what I claim as new and desire to secure by United States Letters Patent is:

1. The method of manufacturing cork gaskets comprising the steps of molding a relatively thick flat ground cork body having a plurality of sections integral with each other and of thickness greater than their width, said sections surrounding at least one relatively large opening through said body; introducing hot air into the openings of said body and heating the exterior surfaces thereof to bake said body into a relatively rigid self-supporting frame; introducing cool air into said openings of said body and cooling the exterior surfaces thereof to rapidly reduce the temperature of said frame; trimming one of the flat surfaces of said frame and slicing a multiplicity of thin sheets from the side thereof whereby each sheet is a marginal shape having integral endless sectional strips corresponding in size and shape to each of said sections and an internal aperture corresponding in size and shape to each opening of said frame, and die cutting, from around each aperture of each of said sheets, a gasket of endless strip form and of shape generally corresponding to the shape of said apertures but larger than said apertures and spaced from the inner and outer edges of said sectional strips at all points.

2. The method of manufacturing cork gaskets comprising the steps of molding a relatively thick flat ground cork body having a plurality of sections integral with each other and of thickness greater than their width, said sections surrounding at least one relatively large opening through said body; introducing hot air into the opening of said body and heating the exterior surfaces thereof to bake said body into a relatively rigid self-supporting frame; trimming one of the flat surfaces of said frame and slicing a multiplicity of thin sheets from the side thereof whereby each sheet is a marginal shape having integral endless sectional strips corresponding in size and shape to each of said sections and an internal aperture corresponding in size and shape to each opening of said frame, and die cutting, from around each aperture of each of said sheets, a gasket of endless strip form and of shape generally corresponding to the shape of said apertures but larger than said apertures and spaced from the inner and outer edges of said sectional strips at all points.

3. The method of manufacturing cork gaskets comprising the steps of molding a relatively thick flat ground cork body having a plurality of sections integral with each other and surrounding at least one relatively large opening through said body; introducing hot air into the openings of said body and heating the exterior surfaces thereof to bake said body into a relatively rigid self-supporting frame; trimming one of the flat surfaces of said frame and slicing a multiplicity of thin sheets from the side thereof whereby each sheet is a marginal shape having integral endless sectional strips corresponding in size and shape to each of said sections and an internal aperture corresponding in size and shape to each opening of said frame, and die cutting, from around each aperture of each of said sheets, a gasket of endless strip form and of shape generally corresponding to the shape of said apertures but larger than said apertures and spaced from the inner and outer edges of said sectional strips at all points.

HOWARD L. GLOVER.

References Cited in the file of this patent

UNITED STATES PATENTS

| Number | Name | Date |
|---|---|---|
| 997,056 | Grunzweig | July 4, 1911 |
| 1,361,081 | MacKinnon | Dec. 7, 1920 |
| 1,650,687 | Bond | Nov. 29, 1927 |
| 1,839,209 | Elder | Jan. 5, 1932 |
| 1,888,410 | Schacht | Nov. 22, 1932 |
| 2,126,435 | Weisenburg | Aug. 9, 1938 |